United States Patent
Abelha Ferreira et al.

(10) Patent No.: US 11,675,877 B2
(45) Date of Patent: Jun. 13, 2023

(54) METHOD AND SYSTEM FOR FEDERATED DEPLOYMENT OF PREDICTION MODELS USING DATA DISTILLATION

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/462,509

(22) Filed: Aug. 31, 2021

(65) Prior Publication Data
US 2023/0068179 A1 Mar. 2, 2023

(51) Int. Cl.
*G06F 16/00* (2019.01)
*G06F 18/214* (2023.01)
(Continued)

(52) U.S. Cl.
CPC ........ *G06F 18/214* (2023.01); *G06F 16/2358* (2019.01); *G06F 16/2365* (2019.01); *G06F 16/285* (2019.01); *G06F 18/217* (2023.01)

(58) Field of Classification Search
CPC ........ G06F 30/23; G06F 16/538; G06F 16/55; G06F 16/58; G06F 40/58; G06F 7/08; G06F 16/332; G06F 16/3325; G06F 16/3328; G06F 16/3331; G06F 16/3341; G06F 16/335; G06F 16/337; G06F 16/355; G06F 16/951; G06F 16/9535; G06F 40/279; G06F 40/30; G06F 16/11; G06F 16/128; G06F 16/1734; G06F 16/182; G06F 16/215; G06F 16/22; G06F 16/2453; G06F 16/2455; G06F 16/24573; G06F 16/24578; G06F 16/258;
(Continued)

(56) References Cited

U.S. PATENT DOCUMENTS

| | | | |
|---|---|---|---|
| 8,977,621 B1* | 3/2015 | Paiz | G06F 16/951 707/738 |
| 9,355,359 B2 | 5/2016 | Welinder et al. | |

(Continued)

OTHER PUBLICATIONS

D. E. Rumelhard, G. E. Hinton and R. J. Williams, "Learning representations by back-progating errors," Cognitive modeling, vol. 5, No. 3, 1998.
(Continued)

*Primary Examiner* — Shyue Jiunn Hwa
(74) *Attorney, Agent, or Firm* — Chamberlain, Hrdlicka, White, Williams & Aughtry

(57) ABSTRACT

Techniques described herein relate to a method for managing data nodes of data node clusters. The method includes obtaining, by a data node manager, a request to deploy a model to a data node; in response to obtaining the model deployment request: identifying, by the data node manager, a data node cluster associated with the data node; making a first determination, by the data node manager, that the data node cluster is associated with an available distilled dataset; and in response to the first determination: generating, by the data node manager, a model using the available distilled dataset; and deploying, by the data node manager, the model to the data node.

20 Claims, 6 Drawing Sheets

(51) Int. Cl.
*G06F 16/23* (2019.01)
*G06F 16/28* (2019.01)
*G06F 18/21* (2023.01)

(58) Field of Classification Search
CPC ...... G06F 16/284; G06F 16/285; G06F 16/93;
G06F 16/953; G06F 18/214; G06F
18/2185; G06F 18/41; G06F 40/169;
G06F 40/295; G06F 9/5027; G06F 9/542
See application file for complete search history.

(56) References Cited

U.S. PATENT DOCUMENTS

| | | | |
|---|---|---|---|
| 11,073,828 | B2 | 7/2021 | Paden |
| 11,468,128 | B1* | 10/2022 | Paiz ...................... G06F 16/953 |
| 11,470,064 | B2 | 10/2022 | Lally et al. |
| 2017/0068714 | A1* | 3/2017 | Selfridge .............. G06F 16/284 |
| 2019/0294627 | A1* | 9/2019 | Chaudhuri .............. G06F 16/58 |
| 2021/0182912 | A1 | 6/2021 | Misra et al. |
| 2021/0248105 | A1 | 8/2021 | Gentile et al. |
| 2022/0019829 | A1 | 1/2022 | Tal et al. |

OTHER PUBLICATIONS

Endres, D.M. and Schindelin, J.E., "A New Metric for Probability Distributions". IEEE Transactions on Information theory, vol. 49, No. 7, pp. 1858-1860, Jul. 2003 (3 pages).
H. Brendan McMahan et al.; "Communication-Efficient Learning of Deep Networks from Decentralized Data"; Proceedings of the 20th International Conference on Artificial Intelligence and Statistics, Proceedings of Machine Learning Research (PMLR); vol. 54; pp. 1273-1282; 2017 (http://proceedings.mlr.press/v54/mcmahan17a.html).
K. Makino and T. Uno, "New Algorithms for Enumerating All Maximal Cliques", Scandinavian Workshop on Algorithm Theory, pp. 260-272, 2004 (12 pages).
Konecny et al., Federated Learning: Strategies for Improving Communication Efficiency, Oct. 18, 2016, 5 pages.
Li et al., Federated Learning: Challenges, Methods, and Future Directions, Aug. 21, 2019, 21 pages.
Nelson, J., 2012. "Sketching and Streaming Algorithms for Processing Massive Data". XRDS: Crossroads, The ACM Magazine for Students, 19(1), pp. 14-19.
Oza, P. and Patel, V.M., 2019. C2ae: Class conditioned autoencoder for open-set recognition. In Proceedings of the IEEE/CVF Conference on Computer Vision and Pattern Recognition (pp. 2307-2316).
Wang et al., "Dataset Distillation", arXiv preprint arXiv:1811.10959. v3, Feb. 24, 2020, 14 pages.
Wang et al., Dataset Distillation, Nov. 27, 2018, 14 pages.
Zhou et al., Distilled On-Shot Federated Learning, Oct. 26, 2020, 14 pages.

* cited by examiner

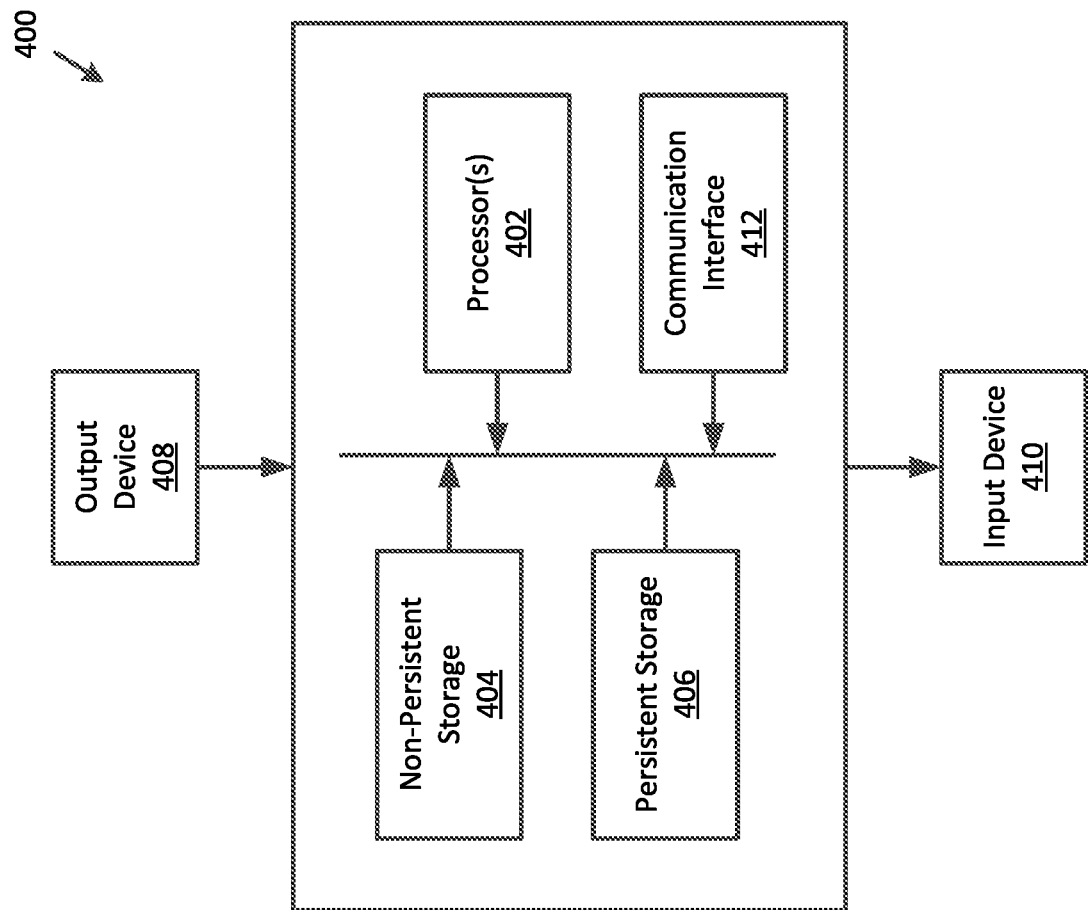

METHOD AND SYSTEM FOR FEDERATED DEPLOYMENT OF PREDICTION MODELS USING DATA DISTILLATION

BACKGROUND

Computing devices may provide services. To provide the services, the computing devices may use models. The models may be trained to provide the services. To train the models, computing devices may obtain and process large quantities of data. Additionally, the data may be transmitted between computing devices for processing and to train the aforementioned models. Data from computing devices in which the models are to be deployed may be required to train the models.

SUMMARY

In general, certain embodiments described herein relate to a method for managing data nodes of data node clusters. The method may include obtaining, by a data node manager, a request to deploy a model to a data node; in response to obtaining the model deployment request: identifying, by the data node manager, a data node cluster associated with the data node; making a first determination, by the data node manager, that the data node cluster is associated with an available distilled dataset; and in response to the first determination: generating, by the data node manager, a model using the available distilled dataset; and deploying, by the data node manager, the model to the data node.

In general, certain embodiments described herein relate to a non-transitory computer readable medium that includes computer readable program code, which when executed by a computer processor enables the computer processor to perform a method for managing data nodes of data node clusters. The method may include obtaining, by a data node manager, a request to deploy a model to a data node; in response to obtaining the model deployment request: identifying, by the data node manager, a data node cluster associated with the data node; making a first determination, by the data node manager, that the data node cluster is associated with an available distilled dataset; and in response to the first determination: generating, by the data node manager, a model using the available distilled dataset; and deploying, by the data node manager, the model to the data node.

In general, certain embodiments described herein relate to a system for managing data nodes of data node clusters. The system may include a data node cluster and a data node manager associated with the data node cluster. The data node manager may include a processor and memory, and may be configured to obtain a request to deploy a model to a data node; in response to obtaining the model deployment request: identify the data node cluster associated with the data node; make a first determination that the data node cluster is associated with an available distilled dataset; and in response to the first determination: generate a model using the available distilled dataset; and deploy the model to the data node.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4 shows a diagram of a computing device in accordance with one or more embodiments of the invention.

DETAILED DESCRIPTION

Figure 1:
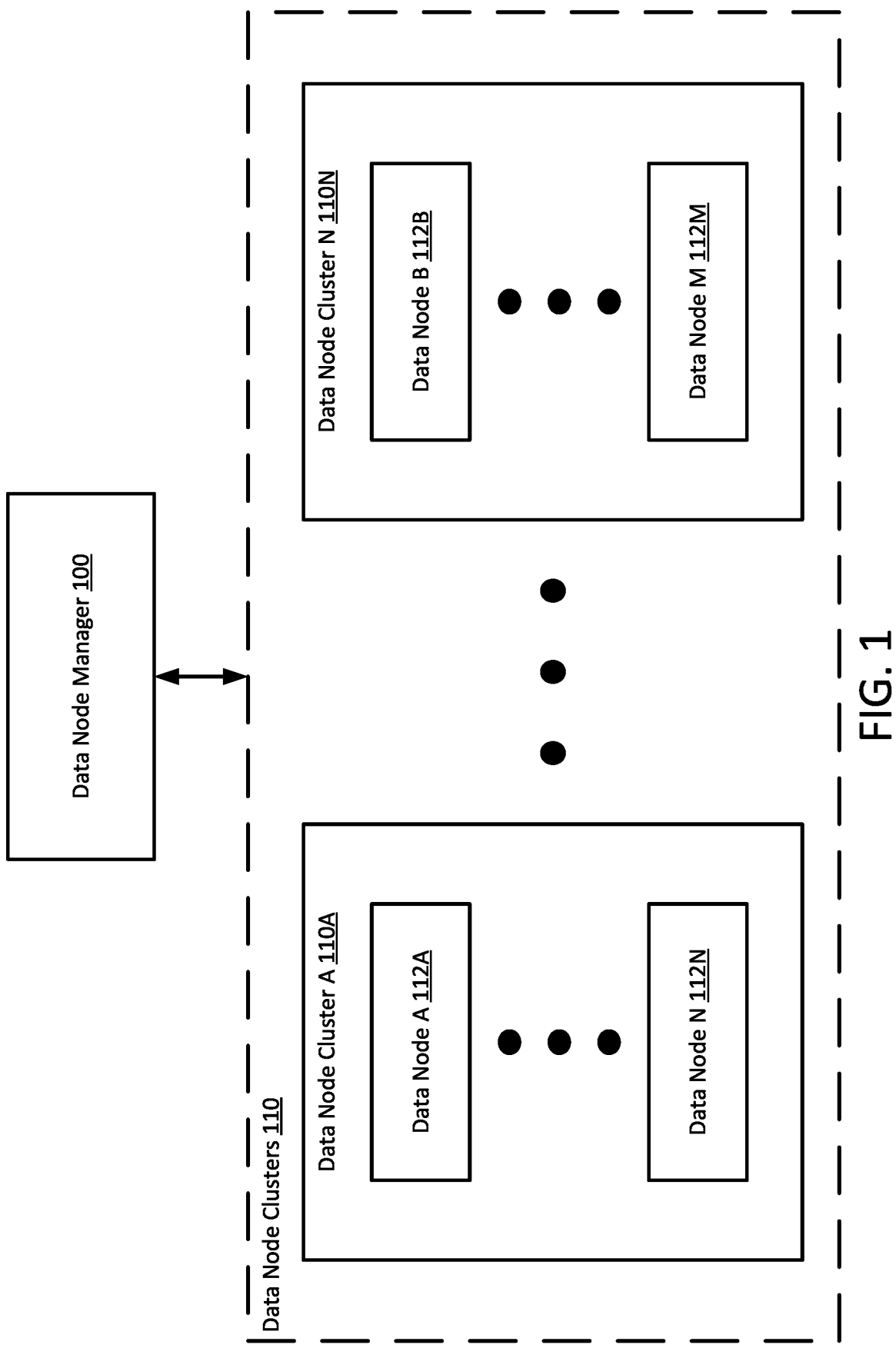
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for deploying prediction models to data nodes using federated learning and dataset distillation.

In one or more embodiments of the invention, data nodes use prediction models to provide computer implemented services for users. Such prediction models may require large quantities of data for training. The data nodes may not include the computing resources necessary to perform prediction model training. The data nodes may therefore obtain trained models from another entity such as a data node manager. The data node manager may require data representative of the data nodes to generate prediction models for the data nodes.

Therefore, large quantities of data may be transmitted between data nodes and the data node manager to train prediction models, resulting in large portions of computing resources of the data nodes and the data node manager to obtain and transmit the large quantities of data. Additionally, by sharing such data, data nodes may be vulnerable to privacy and/or security issues. Furthermore, as additional data nodes are connected to the data node manager, the data node manager must generate prediction models using data representative of the additional data nodes.

To address, at least in part, the aforementioned problems that may arise when generating prediction models for data nodes, in one or more embodiments of the invention, a data node manager deploys prediction models to data nodes using federated learning and dataset distillation. Due to the large quantities of data nodes that may be connected to the data node manager, the data nodes may be grouped into data node clusters. A data node cluster may include one or more data nodes that share one or more similarities. The similarities may include same type of data node (e.g., smart vehicle, security camera, etc.), geographic location, and/or any other similarity without departing from the invention. Data nodes of a data node cluster may include the same type of predictions models. For example, a data node cluster may include data nodes that include security cameras that capture images. Each data node of the data node cluster may run facial recognition prediction models using the images captured by the security cameras.

In one or more embodiments of the invention, the data node manager may generate a distilled dataset associated with each data node cluster using dataset distillation. As such, when generating the distilled data set, the data node manager may provide the distilled dataset to the data nodes of the data node cluster. Each of the data nodes may generate a prediction model using the distilled dataset and perform verification using verification data associated with each of the data nodes to generate distilled dataset update parameters. The data node manager may obtain and merge together the distilled dataset update parameters from each data node of the data node cluster. The data node manager may use the merged distilled dataset update parameters to generate an updated distilled dataset. This process may be repeated for a configurable amount of times until an available distilled dataset is generated. The data node manager may use the available distilled dataset associated with the data node cluster to deploy prediction models to new data nodes of the data node cluster or redeploy prediction models to data nodes of the data node cluster.

Accordingly, prediction models may be deployed to data nodes of data node clusters without the transmission of data node data between the data nodes and the data node manager. This may improve the efficiency and security of deploying prediction models to data nodes by circumventing the requirement of transmission of large quantities of data node data between the data nodes and the data node manager to deploy prediction models. Additionally, distilled datasets representative to the data nodes of the data node cluster may be used to efficiently deploy prediction models to new data nodes of data node clusters as data node clusters grow. By using distilled datasets to deploy prediction models, the data nodes may reduce the amount of data stored locally for prediction model training purposes.

FIG. 1 shows a diagram of a system in accordance with one or more embodiments of the invention. The system may include a data node manager (100) and data node clusters (110). The data node clusters (110) may include any quantity of data node clusters without departing from the invention. For example, the data node clusters (110) may include data node cluster A (110A) and data node cluster N (110N). Each data node cluster (e.g., 110A, 110N) may include any quantity of data nodes. For example, data node cluster A (110A) may include data node A (112A) and data node N (112N), and data node cluster N (110A) may include data node B (112B) and data node M (112M). The system may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system of FIG. 1 is discussed below.

In one or more embodiments of the invention, the data node manager (100) includes the functionality to perform prediction model deployment services for data nodes (e.g., 112A, 112N, 112B, 112M) of data node clusters (110) using federated learning and dataset distillation. To do so, the data node manager (100) may include the functionality to deploy prediction models to new data nodes (e.g., 112N) of data node clusters (e.g., 110A) using available distilled dataset associated with the data node clusters (e.g., 110A). The data node manager (100) may also include the functionality to generate available distilled datasets. To perform the prediction model deployment services, the data node manager (100) may include the functionality to perform the methods depicted in FIGS. 2A-2B. For additional information regarding the functionality of the data node manager (100), refer to FIGS. 2A-2B. The data node manager (100) may include other and/or additional functionalities without departing from the invention.

In one or more embodiments of the invention, the data node manager (100) is implemented as one or more computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof. In one or more embodiments of the invention, the data node manager (100) includes more computing resources (i.e., the components discussed above) than the data nodes (112A, 112N, 112B, 112M) to perform the aforementioned prediction model deployment services. For additional information regarding computing devices, refer to FIG. 4.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, each data node cluster (110A, 110N) of the data node clusters (110) are a collection of one or more data nodes (e.g., 112A, 112N) that share one or more similarities as discussed above. Each data node cluster (110A, 110N) may include any quantity of data nodes (e.g., 112A, 112N) without departing from the invention. Data nodes (e.g., 112A, 112N) may be added and/or removed from the data node clusters (110) over time.

In one or more embodiments of the invention, the data nodes (112A, 112N, 112B, 112M) include the functionality to perform computer implemented actions and/or services and obtain prediction model deployment services from the data node manager (100). The computer implemented actions and/or services may include any computer implemented functionality without departing from the invention. The computer implemented functionality may include, for example, inferencing, facial recognition, classification, data analysis, data processing, providing services to client devices, serving web content via the Internet, etc.

In one or more embodiments of the invention, to obtain prediction model deployment services from the data node manager (100), the data nodes (112A, 112N, 112B, 112M) include the functionality to perform prediction model optimization using a distilled dataset. To perform prediction model optimization, the data nodes (112A, 112N, 112B, 112M) may include the functionality to perform the methods depicted in FIG. 2C. For additional information regarding the functionalities of the data nodes (112A, 112N, 112B, 112M), refer to FIG. 2C. The data nodes (112A, 112N, 112B, 112M) may include other and/or additional functionalities without departing from the invention.

In one or more embodiments of the invention, the data nodes (112A, 112N, 112B, 112M) are implemented as computing devices. The computing devices may be an embodiment of the computing device discussed above. For additional information regarding computing devices, refer to the above discussion or to FIG. 4.

Figure 2A:
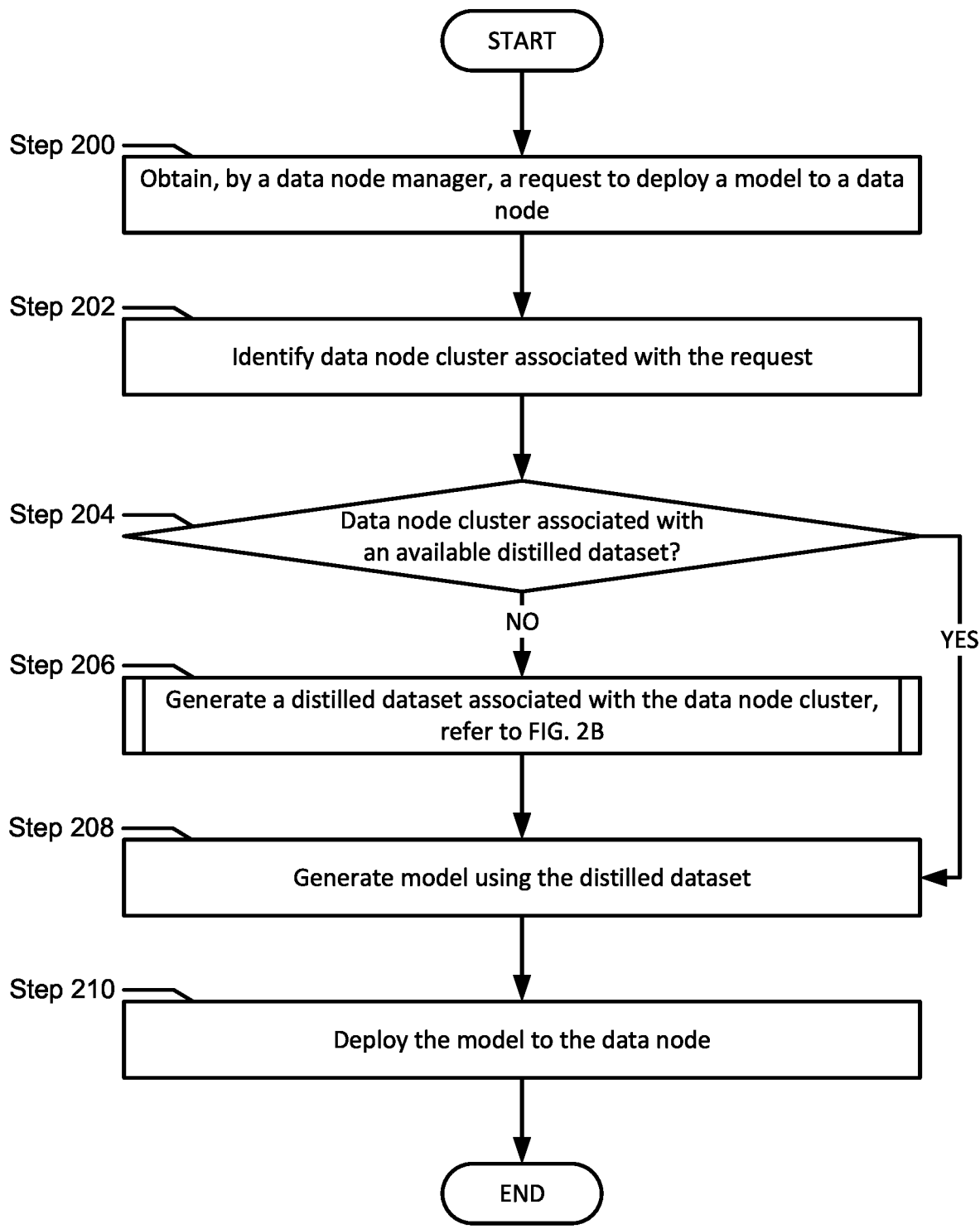
FIG. 2A shows a flowchart of a method in accordance with one or more embodiments of the invention.

FIG. 2A shows a flowchart of a method in accordance with one or more embodiments of the invention. The method depicted in FIG. 2A may be performed by a data node manager (100, FIG. 1) to deploy a prediction model to data node. All, or a portion of, the method of FIG. 2A may be performed by other components illustrated in FIG. 1 without departing from the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a request to deploy a model to a data node is obtained by the data node manager. In one or more embodiments of the invention, the data node manager obtains a message. The message may be provided to the data node manager by the data node, a user of the system, and/or another entity not illustrated in the system depicted in FIG. 1. The message may include a request to deploy a prediction model to the data node. The message may further include a data node identifier (e.g., a unique combination of bits used to specify a data node) associated with the data node, a data node cluster identifier (e.g., a unique combination of bits used to specify a data node cluster) associated with the data node cluster that includes the data node, and/or additional information associated with the request to deploy a prediction model to the data node without departing from the invention. The request to deploy a prediction model may be provided to the data node manager using any appropriate method of data transmission without departing from the invention. As an example, the data node or user may communicate the request as network data traffic units over a series of network devices that operatively connect to the data node or the user to the data node manager. The request to deploy a model to a data node may be obtained by the data node manager via other and/or additional methods without departing from the invention.

In Step 202, a data node cluster associated with the request is identified. In one or more embodiments of the invention, the data node manager includes a data node cluster registry. The data node cluster registry may include one or more data structures stored in a storage device of the data node manager that includes data node cluster information. The data node cluster information may include, for example, a list of data node cluster identifiers, data node identifiers associated with each data node cluster identifier, contact information (e.g., network address, port number, etc.) associated with each data node identifier, previously generated distilled datasets associated with each data node cluster, timestamps that specify when each distilled dataset was generated, initial model parameters (e.g., learning rate, neural network weights, etc.) associated with each data node cluster identifier, and/or additional information associated with data nodes and data node clusters of the system. The data node cluster registry may be updated by the data node manager or a user of the data node manager when a data node or data node cluster is deployed and/or registers with the data node manager.

In one or more embodiments of the invention, the data node manager uses the data node cluster registry to match the data node identifier included in the request with a data node identifier included in the data node cluster registry. The data node manager may identify the data node cluster associated with the data node by identifying the data node cluster identifier associated with the data node identifier included in the data node cluster registry. The data node cluster associated with the request may be identified via other and/or additional methods without departing from the invention.

In Step 204, a determination is made as to whether the data node cluster is associated with an available distilled dataset. As discussed above, the data node cluster registry may include previously generated distilled datasets associated with the data node clusters. The data node cluster registry may also include timestamps that specify when the distilled datasets were generated. The data node manager may check the data node cluster registry to determine whether the data node cluster is associated with an available distilled dataset. In one or more embodiments of the invention, if the data node cluster registry includes a distilled dataset associated with the data node cluster that was generated before a configurable dataset distillation expiration time has expired, then the data node manager determines that there is an available distilled dataset associated with the data node cluster. In one or more embodiments of the invention, if the data node cluster registry does not include a distilled dataset associated with the data node cluster or includes a distilled dataset that was generated after a configurable dataset distillation expiration time has expired, then the data node manager determines that there is not an available distilled dataset associated with the data node cluster. The determination as to whether the data node cluster is associated with an available distilled dataset may be made via other and/or additional methods without departing from the invention.

In one or more embodiments of the invention, if it is determined that the data node cluster is associated with an available distilled dataset, then the method proceeds to Step 208. In one or more embodiments of the invention, if it is determined that the data node cluster is not associated with an available distilled dataset, then the method proceeds to Step 206.

In Step 206, a distilled dataset associated with the data node cluster is generated. In one or more embodiments of the invention, the data node manager performs dataset distillation to generate a distilled dataset associated with the data node cluster. For additional information regarding the generation of a distilled dataset associated with the data node cluster, refer to FIG. 2B.

In Step 208, a model is generated using the distilled dataset. In one or more embodiments of the invention, the data node manager applies the initial model parameters and a prediction model training algorithm to the distilled dataset to generate a prediction model. The prediction algorithm may include, for example, one or more neural networks. The prediction algorithm may include other types of prediction algorithms (e.g., random forest, linear regression, classification and regression trees, etc.) without departing from the invention. A model may be generated using the distilled dataset via other and/or additional methods without departing from the invention.

In Step 210, the model is deployed to the data node. In one or more embodiments of the invention, the data node manager sends a message to the data node. The message includes the generated prediction model. The message may include other and/or additional information associated with the generated prediction model without departing from the invention. The prediction model may be provided to the data node using any appropriate method of data transmission without departing from the invention. As an example, the data node manager may communicate the prediction model as network data traffic units over a series of network devices that operatively connect the data node to the data node manager. The model may be deployed to the data node by the data node manager via other and/or additional methods without departing from the invention.

When the data node obtains the model, the data node may further optimize the model using data associated with the data node and/or begin providing computer implemented services using the model.

In one or more embodiments of the invention, the method may end following Step 210.

Figure 2B:
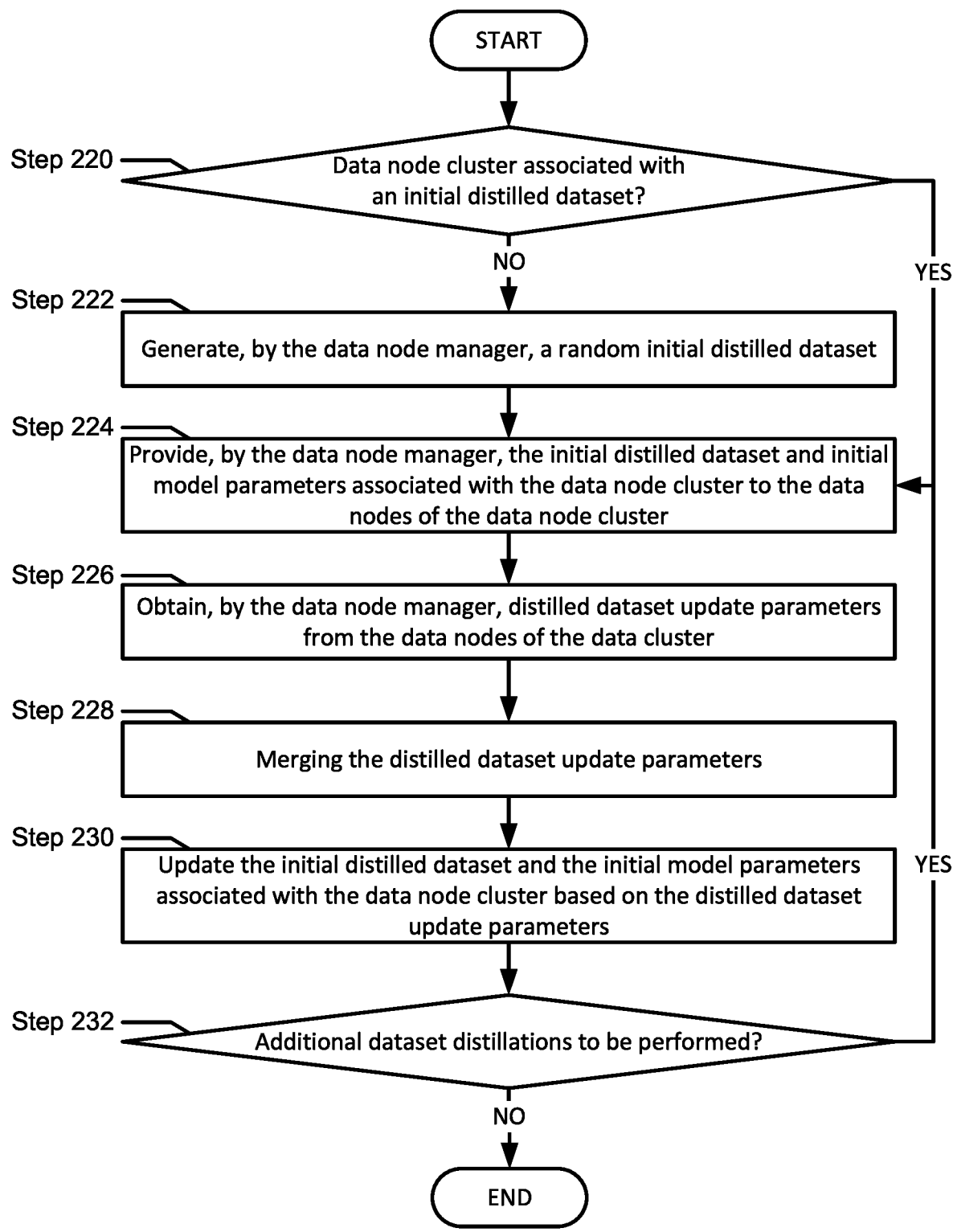
FIG. 2B shows a flowchart of a method in accordance with one or more embodiments of the invention.

FIG. 2B shows a flowchart of a method in accordance with one or more embodiments of the invention. The method depicted in FIG. 2B may be performed by a data node manager (100, FIG. 1) to generate a distilled dataset associated with a data node cluster. All, or a portion of, the method of FIG. 2B may be performed by other components illustrated in FIG. 1 without departing from the invention.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a determination is made as to whether the data node cluster is associated with an initial distilled dataset. As discussed above, the data node cluster registry may include a previously generated distilled dataset that has expired based on a configurable dataset distillation expiration time. In such a scenario, the previously generated distilled dataset may be identified by the data node manager as an initial distilled dataset and may be updated. In one or more embodiments of the invention, if the data node manager identifies a previously generated distilled dataset included in the data node cluster registry that has expired that is associated with the data node cluster, then the data node manager determines that the data node cluster is associated with an initial distilled dataset. In one or more embodiments of the invention, if the data node manager does not identify a previously generated distilled dataset included in the data node cluster registry, then the data node manager determines that the data node cluster is not associated with an initial distilled dataset. The determination as to whether the data node cluster is associated with an initial distilled dataset may be determined via other and/or additional methods without departing from the invention.

In one or more embodiments of the invention, if it is determined that the data node cluster is associated with an initial distilled dataset, then the method proceeds to Step 224. In one or more embodiments of the invention, if it is determined that the data node cluster is not associated with an initial distilled dataset, then the method proceeds to Step 222.

In Step 222, the data node manager generates a random initial distilled dataset. In one or more embodiments of the invention, the data node manager generates a random initial distilled dataset that includes randomized synthetic data relevant to the models used by the data nodes of the data node cluster. For example, for images used for a facial recognition model, the data node manager may generate a random initial distilled dataset that includes synthetic white noise images using any appropriate methods of generating white noise images without departing from the invention. The data node manager may generate a random initial distilled dataset using any type of randomly generated data associated with the models used by the data nodes of the data node cluster without departing from the invention. The data node manager may generate a random initial distilled dataset via other and/or additional methods without departing from the invention.

In Step 224, the data node manager provides the initial distilled dataset and initial model parameters associated with the data node cluster to the data nodes of the data node cluster. In one or more embodiments of the invention, the data node manager sends a message to the data nodes of the data node cluster. The message may include the initial distilled dataset. The message may further include initial model parameters associated with the data nodes of the data node cluster specified by the data node cluster registry. The message may include other and/or additional information without departing from the invention. The message may be compressed using any appropriate method of data compression (e.g., LZW, LZSS, LZMA, etc.) without departing from the invention. The initial distilled dataset and the initial model parameters may be provided to the data nodes using any appropriate method of data transmission without departing from the invention. As an example, the data node manager may communicate the initial distilled dataset and the initial model parameters as network data traffic units over a series of network devices that operatively connect the data nodes to the data node manager. The data node manager may provide the initial distilled dataset and initial model parameters associated with the data node cluster to the data nodes of the data node cluster via other and/or additional methods without departing from the invention.

In Step 226, the data node manager obtains distilled dataset update parameters from the data nodes of the data node cluster. In one or more embodiments of the invention, the data node manager obtains messages from the data nodes of the data node cluster. The messages may include the distilled dataset update parameters. The messages may include other and/or additional information without departing from the invention. The message may be compressed, and therefore decompressed by the data node manager, using any appropriate method of data compression (e.g., LZW, LZSS, LZMA, etc.) without departing from the invention. The distilled dataset update parameters may be provided to the data node manager using any appropriate method of data transmission without departing from the invention. As an example, the data nodes may communicate the distilled dataset update parameters as network data traffic units over a series of network devices that operatively connect to the data nodes to the data node manager. The data node manager may obtain the distilled dataset update parameters from the data nodes of the data node cluster via other and/or additional methods without departing from the invention.

In Step 228, the data node manager merges the distilled dataset update parameters. In one or more embodiments of the invention, the data node manager merges the distilled dataset update parameters from each data node of the data node cluster by aggregating the distilled dataset update parameters using any appropriate method of data aggregation without departing from the invention. The distilled dataset update parameters may be one or more data structures generated by the data nodes that include information regarding how to update the distilled dataset and initial model parameters to improve the accuracy of models generated using the updated distilled dataset based on loss calculated through model verification. The information may include directions and size of steps (i.e., gradient descent steps) to use to update both the synthetic data included in the distilled dataset and the learning rate used to generate models. The distilled data update parameters may include other and/or additional information regarding specific updates to make to the distilled data and/or the initial model parameters without departing from the invention. The data node manager may merge the distilled dataset update parameters via other and/or additional methods without departing from the invention.

In Step 230, the initial distilled dataset and the initial model parameters associated with the data node cluster are updated based on the distilled dataset update parameters. In one or more embodiments of the invention, the data node manager updates the distilled dataset and the initial model parameters by changing the synthetic data included in the distilled dataset based on the information included in the merged distilled data update parameters. As a result, the updated distilled dataset may be representative of all data nodes in the data node cluster and may be used to generate models that are more accurate when used on data of the data nodes.

In Step 232, a determination is made as to whether there are additional dataset distillations to be performed. In one or more embodiments of the invention, the data node cluster registry may include a configurable number of distilled dataset optimization steps associated with each data node cluster. The data node manager may maintain a count of the number of times the distilled dataset associated with the data node cluster has been updated. In one or more embodiment of the invention, if the count of the number of times the distilled dataset associated with the data node cluster is less than the configurable number of distilled dataset optimization steps associated with data node cluster, then the data node manager may determine that there are additional dataset distillations to be performed. In one or more embodiment of the invention, if the count of the number of times the distilled dataset associated with the data node cluster is equal to the configurable number of distilled dataset optimization steps associated with data node cluster, then the data node manager may determine that there are no additional dataset distillations to be performed. The determination as to whether there are additional dataset distillations to be performed may be made via other and/or additional methods without departing from the invention.

In one or more embodiments of the invention, if it is determined that there are additional dataset distillations to be performed, then the method proceeds to Step 224. In one or more embodiments of the invention, if it is determined that there are no additional dataset distillations to be performed, then the method ends following Step 232.

Figure 2C:
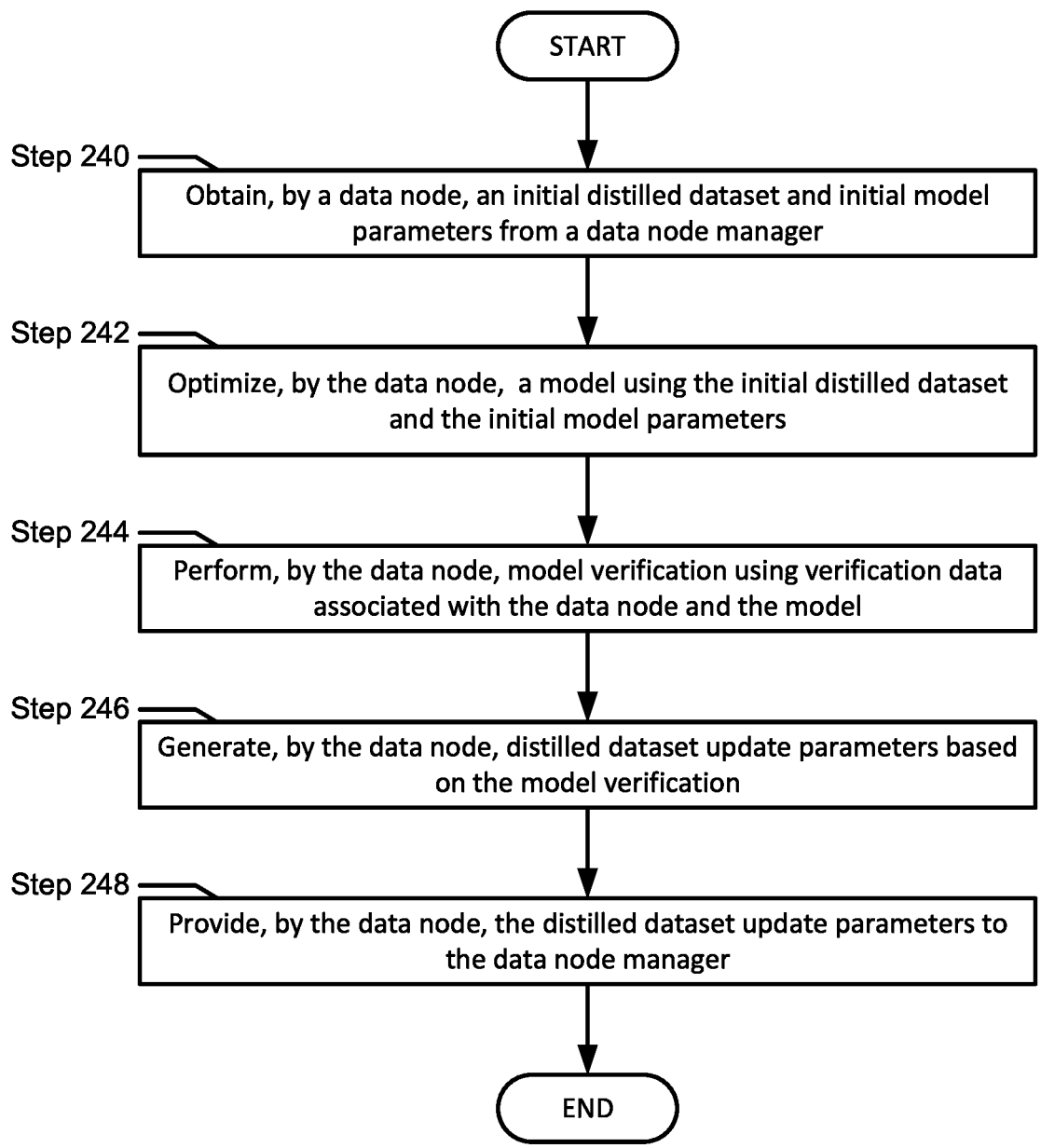
FIG. 2C shows a flowchart of a method in accordance with one or more embodiments of the invention.

FIG. 2C shows a flowchart of a method in accordance with one or more embodiments of the invention. The method depicted in FIG. 2C may be performed by a data node (e.g., 112A, FIG. 1) to perform prediction model optimization using a distilled dataset. All, or a portion of, the method of FIG. 2C may be performed by other components illustrated in FIG. 1 without departing from the invention.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, the data node obtains an initial distilled dataset and initial model parameters from a data node manager. In one or more embodiments of the invention, the data node obtains a message from the data node manager. The message may include the initial distilled dataset. The message may further include initial model parameters associated with the data nodes of the data node cluster specified by the data node cluster registry. The message may include other and/or additional information without departing from the invention. The message may be compressed, and therefore be decompressed by the data node, using any appropriate method of data compression (e.g., LZW, LZSS, LZMA, etc.) without departing from the invention. The initial distilled dataset and the initial model parameters may be provided to the data node using any appropriate method of data transmission without departing from the invention. As an example, the data node manager may communicate the initial distilled dataset and the initial model parameters as network data traffic units over a series of network devices that operatively connect the data nodes to the data node manager. The data node may obtain the initial distilled dataset and initial model parameters associated with the data node cluster from the data node manager via other and/or additional methods without departing from the invention.

In Step 242, the data node optimizes a model using the initial distilled dataset and the initial model parameters. In one or more embodiments of the invention, the data node generates the model by inputting the initial model parameters to a prediction model training algorithm. The initial model parameters may include the learning rate and a model distribution used to initialize the model. The data node may apply the generated model to the distilled dataset to optimize the model. As a result, a prediction model optimized for the initial distilled dataset is generated. The data node may optimize a model using the initial distilled dataset and the initial model parameters via other and/or additional methods without departing from the invention.

In Step 244, the data node performs model verification using the model and verification data associated with the data node. In one or more embodiments of the invention, the data node performs model verification using the model and verification data by applying the model to the verification data of the data node and comparing the predictions of the model with the verification data. The verification data may include labeled data that may be used for model verification. The data node may calculate losses (e.g., loss functions) based on the model verification. The data node may perform model verification using the model and verification data associated with the data node via other and/or additional methods.

In Step 246, the data node generates distilled dataset update parameters based on the model verification. In one or more embodiments of the invention, the data node generates the distilled dataset update parameters based on the losses calculated during model verification performed in Step 244 above. The distilled dataset update parameters may be used to update the initial distilled dataset and the learning rate which may be used to generate an updated model that may generate more accurate predictions when verified using verification data of the data node. The distilled dataset update parameters may be an embodiment of the distilled data update parameters associated with the data node discussed above in Step 228 of FIG. 2B. The data node may generate distilled dataset update parameters based on the model verification via other and/or additional methods without departing from the invention.

In Step 248, the data node provides the distilled dataset update parameters to the data node manager. In one or more embodiments of the invention, the data node sends a message to the data node manager. The message may include the distilled dataset update parameters. The message may include other and/or additional information without departing from the invention. The message may be compressed by the data node using any appropriate method of data compression (e.g., LZW, LZSS, LZMA, etc.) without departing from the invention. The distilled dataset update parameters may be provided to the data node manager using any appropriate method of data transmission without departing from the invention. As an example, the data node may communicate the distilled dataset update parameters as network data traffic units over a series of network devices that operatively connect to the data node to the data node manager. The data node may send the distilled dataset update parameters associated with the data node to the data node manager via other and/or additional methods without departing from the invention.

In one or more embodiments of the invention, the method ends following Step 248.

EXAMPLE

Figure 3:
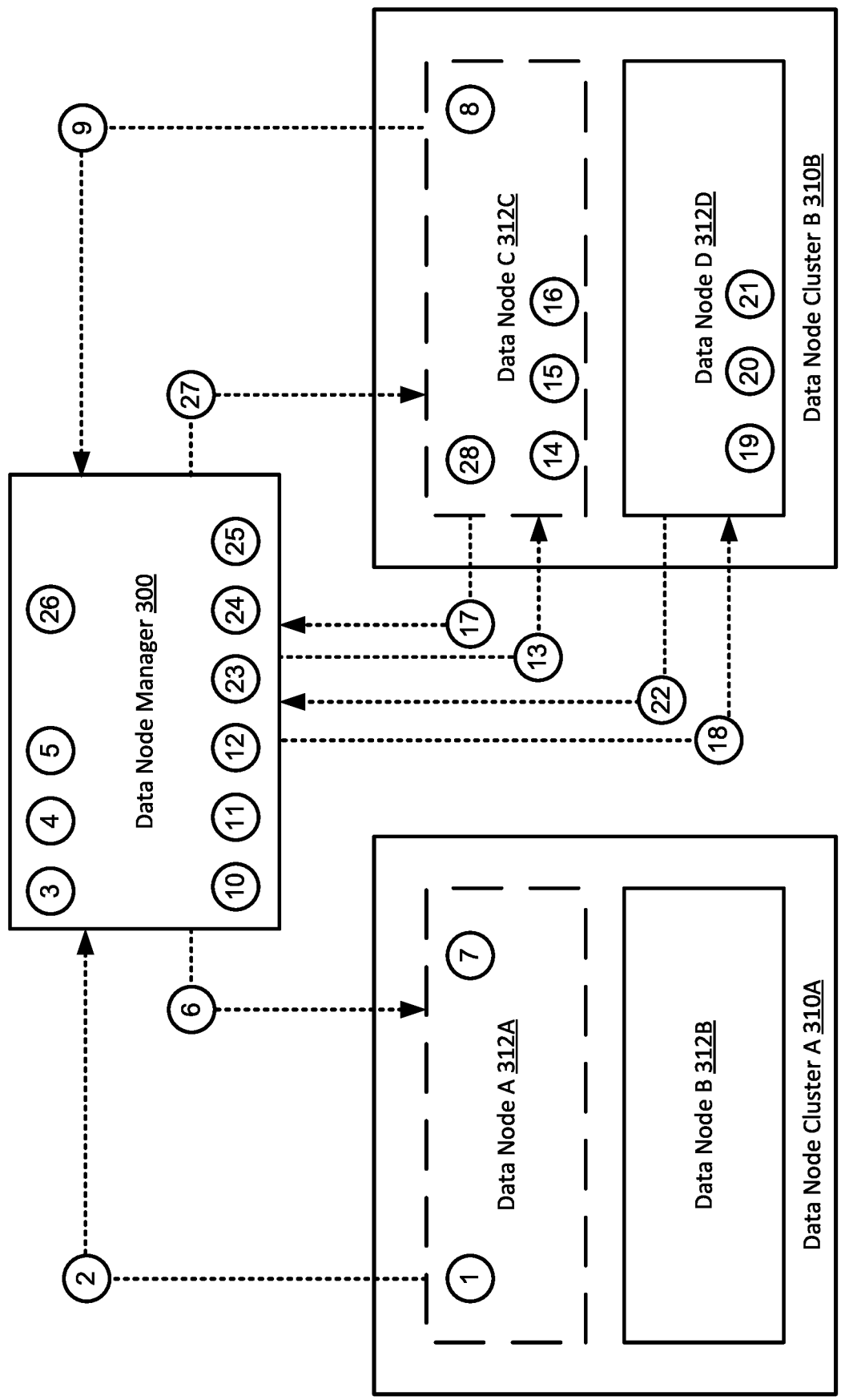
FIG. 3 shows a diagram of the operation of an example system over time in accordance with one or more embodiments of the invention.

FIG. 3 shows a diagram of the operation of an example system over time in accordance with one or more embodiments of the invention. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 3, consider a scenario in which a car company has deployed two smart vehicles in the northeast region of the United States and two smart vehicles in the southwest region of the United states. Each smart vehicle uses inferencing to perform autopilot using cameras attached to the vehicle. The car company wants to deploy inferencing models to the vehicles. To do so, the car company sets up a data center that is connected to each of the four vehicles to deploy models to the vehicles.

In such a scenario, the car company data center is the data node manager (300), while the four vehicles are data nodes. The first two vehicles deployed in the northeast region of the United States are grouped together in the first data node cluster, data node cluster A (310A). The first vehicle is data node A (312A), and the second vehicle is data node B (312B). The second two vehicles deployed in the southwest region of the United States are grouped together in the second data node cluster, data node cluster B (310B). The third vehicle is data node C (312C), and the fourth vehicle is data node D (312D). Each data node (312A, 312B, 312C, 312D) is operatively connected to the data node manager (300).

At Step 1, data node A (312A) is sold and deployed to data node cluster A (310A). As a result, at Step 2, data node A (312A) sends a model deployment request to the data node manager (300). The request includes the data node cluster identifier associated with data node cluster A (310A). In response to obtaining the request, at step 3, the data node manager (300) identifies that data node A (312A) is associated with data node cluster A (310A) based on the data node cluster identifier included in the request and the data node cluster registry. Then, at Step 4, the data node manager (300) determines that data node cluster A (310A) is associated with an available distilled dataset. The available distilled dataset was generated at some point in time prior to Step 1. In response to the determination, at Step 5, the data node manager (300) generates a model using the available distilled dataset associated with data node cluster A (310A) and initial model parameters. At Step 6, the data node manager (300) sends the generated model to data node A (312A). After obtaining the model, at Step 7, data node A (312A) optimizes the model on its own data and uses the model to perform inferencing.

At some point in time after Step 7, at Step 8, data node C (312C) is sold and deployed to data node cluster B (310B). As a result, at Step 9, data node C (312C) sends a model deployment request to the data node manager (300). The request includes the data node cluster identifier associated with data node cluster B (310B). In response to obtaining the request, at step 10, the data node manager (300) identifies that data node C (312C) is associated with data node cluster B (310B), based on the data node cluster identifier included in the request and the data node cluster registry. Then, at Step 11, the data node manager (300) determines that data node cluster B (310B) is not associated with an available distilled dataset.

In response to the determination, at Step 12, the data node manager (300) makes another determination that data node cluster B (310B) is associated with an initial distilled dataset. In response to the determination, at step 13, the data node manager (300) sends the initial distilled dataset and initial model parameters to data node C (312C). At Step 14, data node C (312C) generates a model using the initial distilled dataset and the initial model parameters. At Step 15, data node C (312C) performs model verification using the generated model and verification data associated with data node C (312C) to calculate a loss. Then, at Step 16, data node C (312C) generates distilled data update parameters based on the loss calculated during the performance of model verification. At Step 17, data node C (312C) provides the distilled data update parameters to the data node manager (300).

At step 18, the data node manager (300) sends the initial distilled dataset and initial model parameters to data node D (312D). At Step 19, data node D (312D) generates a model using the initial distilled dataset and the initial model parameters. At Step 20, data node D (312D) performs model verification using the generated model and verification data associated with data node D (312D) to calculate a loss. Then, at Step 21, data node D (312D) generates distilled data update parameters based on the loss calculated during the performance of model verification. At Step 22, data node D (312D) provides the distilled data update parameters to the data node manager (300).

After obtaining the distilled dataset update parameters from both data node C (312C) and data node D (312D), at Step 23, the data node manager merges the distilled dataset update parameters from data node C (312C) and data node D (312D) to obtain aggregated distilled dataset update parameters associated with both data node C (312C) and data node D (312D). At Step 24, the data node manager (300) updates the initial distilled dataset and the learning rate of the initial model parameters using the aggregated distilled dataset update parameters. After that, at Step 25, the data node manager (300) makes a determination that no additional dataset distillations are to be performed. In response to the determination, at Step 26, the data node manager (300) generates a model using the updated distilled dataset and the initial model parameters. At step 27, the data node manager (300) provides the model to data node C (312C). After obtaining the model, at Step 28, data node C (312C) optimizes the model on its own data and uses the model to perform inferencing.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to deploying models using federated learning and dataset distillation. Accordingly, prediction models may be deployed to data nodes of data node clusters using distilled datasets associated with the data node clusters without the transmission of data node data between the data nodes and the data node manager. This may improve the efficiency and security of deploying prediction models to data nodes by circumventing the requirement of transmission of large quantities of data node data between the data nodes and the data node manager to deploy prediction models. Additionally, distilled datasets representative to all the data nodes of the data node cluster may be used to efficiently deploy prediction models to new data nodes of data node clusters as data node clusters grow. By using distilled datasets to deploy prediction models, the data nodes may reduce the amount of data stored locally for prediction model training purposes.

Thus, embodiments of the invention may address the problem of inefficient use of computing resources to deploy models to data nodes. This problem arises due to the technological nature of the environment in which the data nodes operate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data nodes of data node clusters, the method comprising:
   obtaining, by a data node manager, a request to deploy a model to a data node;
   in response to obtaining the model deployment request:
   identifying, by the data node manager, a data node cluster associated with the data node using a data node cluster registry stored in a storage of the data node manager, wherein the data node cluster comprises a plurality of data nodes as specified in the data node cluster registry, wherein the plurality of data nodes comprises the data node as specified in the data node cluster registry;
   making a first determination, by the data node manager, that the data node cluster is associated with an available distilled dataset, wherein:
   the data node cluster registry further comprises the available distilled dataset associated with the data node cluster, and
   the available distilled dataset was generated using distilled dataset update parameters generated by each of the plurality of data nodes of the data node cluster; and
   in response to the first determination:
   generating, by the data node manager, a model using the available distilled dataset; and
   deploying, by the data node manager, the model to the data node.

2. The method of claim 1, wherein the distilled dataset comprises synthetic data associated with the plurality of data nodes of the data node cluster.

3. The method of claim 2, wherein making the first determination, by the data node manager, that the data node cluster is associated with an available distilled dataset comprises:
   identifying a previously generated distilled dataset associated with the data node cluster, wherein the previously generated distilled data is the available distilled dataset.

4. The method of claim 2, wherein making the first determination, by the data node manager, that the data node cluster is associated with an available distilled dataset comprises:
   generating, by the data node manager, a new distilled dataset associated with the data node cluster, wherein the new distilled dataset is the available distilled dataset.

5. The method of claim 4, wherein generating the new distilled dataset associated with the data node cluster comprises:
   making a second determination, by the data node manager, that the data node cluster is not associated with an initial distilled dataset; and
   in response to the second determination:
   generating, by the data node manager, a random initial distilled dataset; and
   providing, by the data node manager, the random initial distilled dataset and initial model parameters to the plurality of data nodes.

6. The method of claim 5, further comprising:
   after the providing, by the data node manager, of the random initial distilled dataset and the initial model parameters to the plurality of data nodes:
   obtaining, by the data node, the random initial distilled dataset and the initial model parameters from the data node manager;
   optimizing, by the data node, an initial model using the random initial distilled dataset and the initial model parameters;
   performing, by the data node, model verification using verification data associated with the data node and the model;
   generating, by the data node, a portion of the distilled dataset update parameters based on the model verification; and
   providing, by the data node, the portion of the distilled dataset update parameters to the data node manager.

7. The method of claim 6, wherein the portion of the distilled dataset update parameters specify updates to the random initial distilled dataset to optimize the initial model for the verification data associated with the data node.

8. The method of claim 6, wherein the initial model and the model comprise the same type of prediction model.

9. The method of claim 6, further comprising,
after the providing, by the data node, of the distilled dataset update parameters to the data node manager:
obtaining, by the data node manager, the distilled dataset update parameters from the plurality of data nodes;
merging the distilled dataset updated parameters to obtain final distilled dataset update parameters; and
updating the random initial distilled dataset and the initial model parameters associated with the data node cluster based on the final distilled dataset update parameters to obtain the distilled dataset associated with the data node cluster.

10. A non-transitory computer readable medium comprising computer readable program code, which when executed by a computer processor enables the computer processor to perform a method for managing data nodes of data node clusters, the method comprising:
obtaining, by a data node manager, a request to deploy a model to a data node;
in response to obtaining the model deployment request:
identifying, by the data node manager, a data node cluster associated with the data node using a data node cluster registry stored in a storage of the data node manager, wherein the data node cluster comprises a plurality of data nodes as specified in the data node cluster registry, wherein the plurality of data nodes comprises the data node as specified in the data node cluster registry;
making a first determination, by the data node manager, that the data node cluster is associated with an available distilled dataset, wherein:
the data node cluster registry further comprises the available distilled dataset associated with the data node cluster, and
the available distilled dataset was generated using distilled dataset update parameters generated by each of the plurality of data nodes of the data node cluster; and
in response to the first determination:
generating, by the data node manager, a model using the available distilled dataset; and
deploying, by the data node manager, the model to the data node.

11. The non-transitory computer readable medium of claim 10, wherein the distilled dataset comprises synthetic data associated with the plurality of data nodes of the data node cluster.

12. The non-transitory computer readable medium of claim 11, wherein making the first determination, by the data node manager, that the data node cluster is associated with an available distilled dataset comprises:
identifying a previously generated distilled dataset associated with the data node cluster, wherein the previously generated distilled data is the available distilled dataset.

13. The non-transitory computer readable medium of claim 11, wherein making the first determination, by the data node manager, that the data node cluster is associated with an available distilled dataset comprises:
generating, by the data node manager, a new distilled dataset associated with the data node cluster, wherein the new distilled dataset is the available distilled dataset.

14. The non-transitory computer readable medium of claim 13, wherein generating the new distilled dataset associated with the data node cluster comprises:

making a second determination, by the data node manager, that the data node cluster is not associated with an initial distilled dataset; and
in response to the second determination:
generating, by the data node manager, a random initial distilled dataset; and
providing, by the data node manager, the random initial distilled dataset and initial model parameters to the plurality of data nodes.

15. A system for managing data nodes of data node clusters, the system comprising:
a data node cluster; and
a data node manager associated with the data node cluster, comprising a processor and memory, and configured to:
obtain a request to deploy a model to a data node;
in response to obtaining the model deployment request:
identify the data node cluster associated with the data node using a data node cluster registry stored in a storage of the data node manager, wherein the data node cluster comprises a plurality of data nodes as specified in the data node cluster registry, wherein the plurality of data nodes comprises the data node as specified in the data node cluster registry;
make a first determination, by the data node manager, that the data node cluster is associated with an available distilled dataset, wherein:
the data node cluster registry further comprises the available distilled dataset associated with the data node cluster, and
the available distilled dataset was generated using distilled dataset update parameters generated by each of the plurality of data nodes of the data node cluster; and
in response to the first determination:
generate a model using the available distilled dataset; and
deploy the model to the data node.

16. The system of claim 15, wherein the distilled dataset comprises synthetic data associated with the plurality of data nodes of the data node cluster.

17. The system of claim 16, wherein making the first determination that the data node cluster is associated with an available distilled dataset comprises:
identifying a previously generated distilled dataset associated with the data node cluster, wherein the previously generated distilled data is the available distilled dataset.

18. The system of claim 16, wherein making the first determination that the data node cluster is associated with an available distilled dataset comprises:
generating a new distilled dataset associated with the data node cluster, wherein the new distilled dataset is the available distilled dataset.

19. The system of claim 18, wherein generating the new distilled dataset associated with the data node cluster comprises:
making a second determination that the data node cluster is not associated with an initial distilled dataset; and
in response to the second determination:
generating a random initial distilled dataset; and
providing the random initial distilled dataset and initial model parameters to the plurality of data nodes.

20. The system of claim 19, wherein the data node is configured to:
after the providing, by the data node manager, of the random initial distilled dataset and the initial model parameters to the plurality of data nodes:

obtain the random initial distilled dataset and the initial model parameters from the data node manager;
optimize an initial model using the random initial distilled dataset and the initial model parameters;
perform model verification using verification data associated with the data node and the model;
generate distilled dataset update parameters based on the model verification; and
provide the distilled dataset update parameters to the data node manager.

* * * * *